A. C. MACARTNEY.
MILKING MACHINE.
APPLICATION FILED MAR. 14, 1917.
1,266,697. Patented May 21, 1918.
4 SHEETS—SHEET 2.
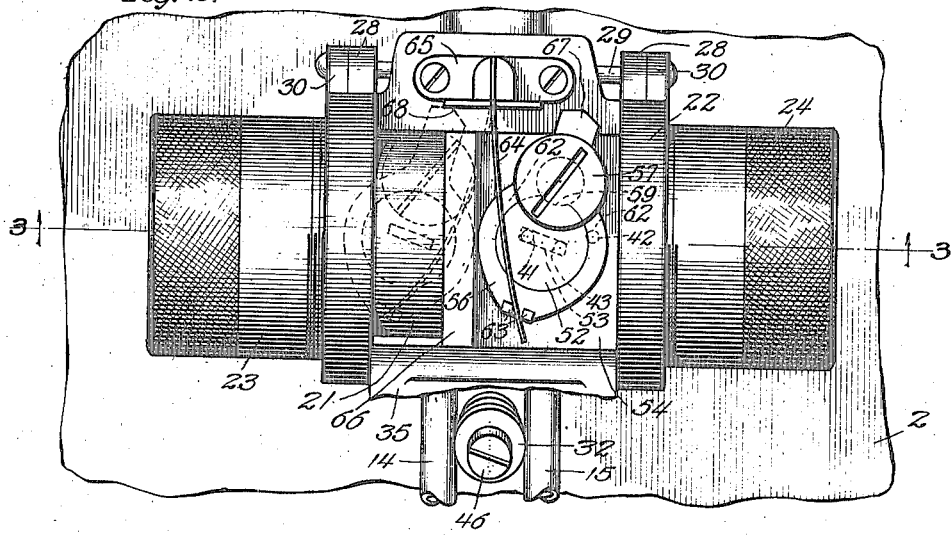
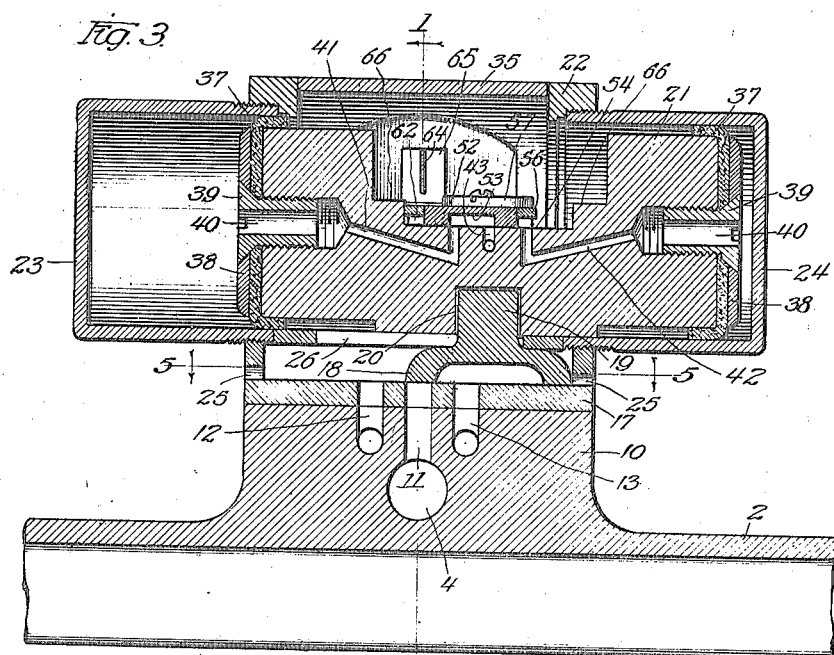
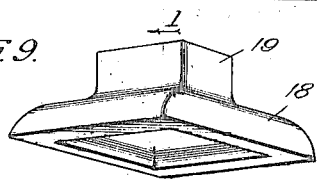
Inventor
Arthur C. Macartney
By Cheever & Cox
Attys:

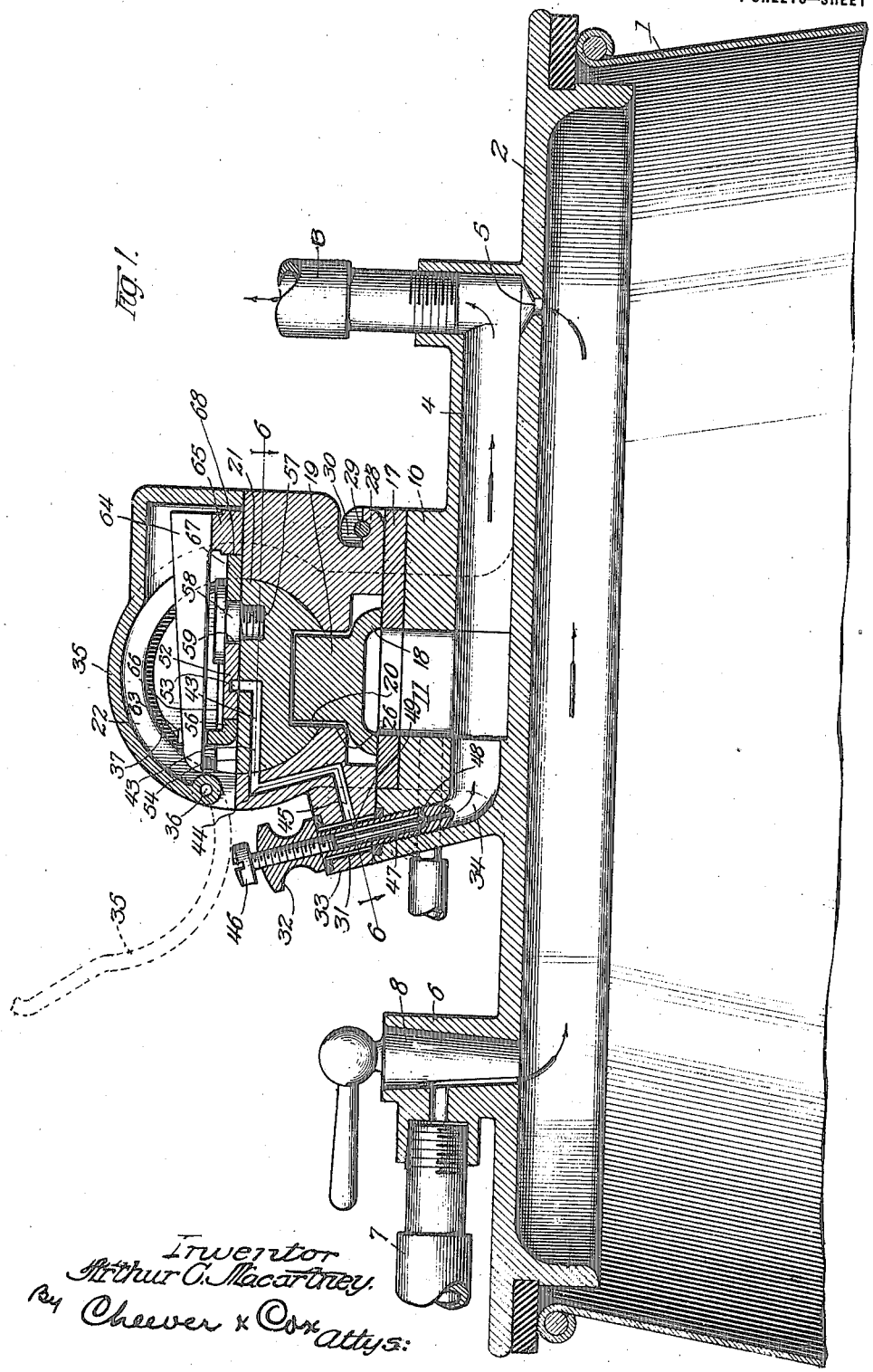

A. C. MACARTNEY.
MILKING MACHINE.
APPLICATION FILED MAR. 14, 1917.
1,266,697.
Patented May 21, 1918.
4 SHEETS—SHEET 3.
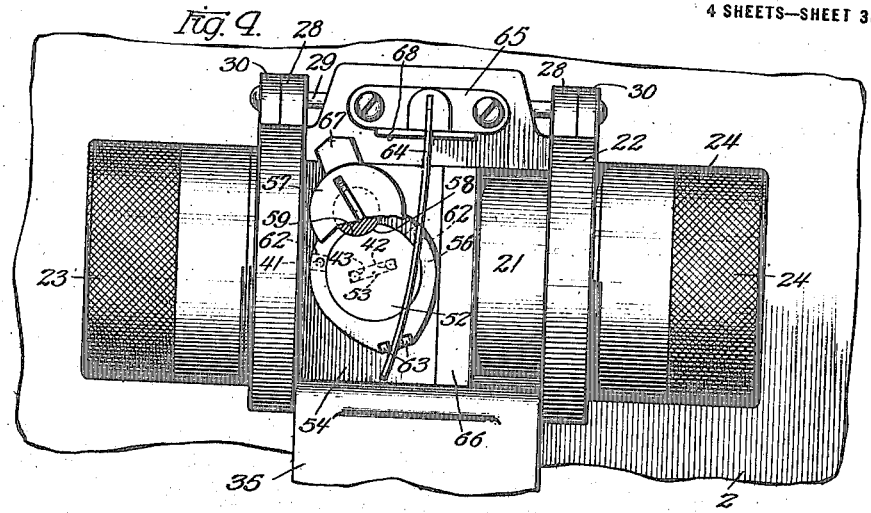
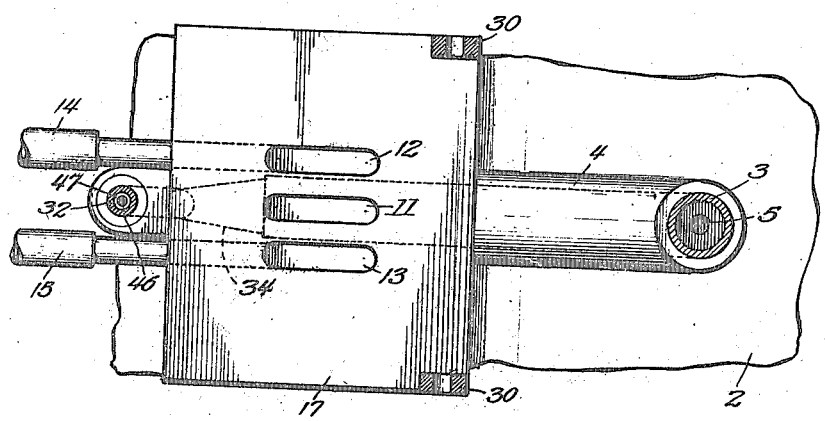
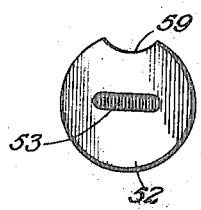
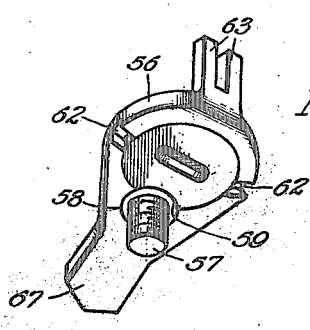
Inventor
Arthur C. Macartney.
By Cheever & Cox
Attys.

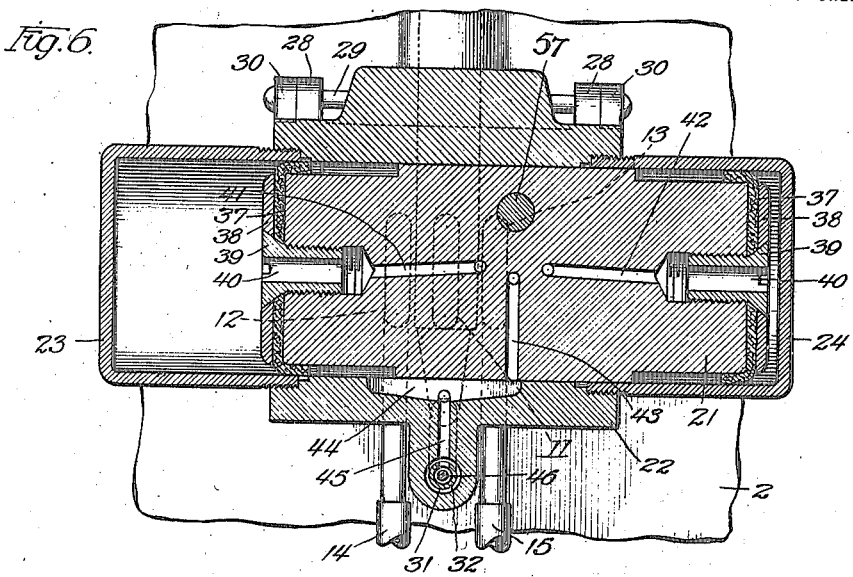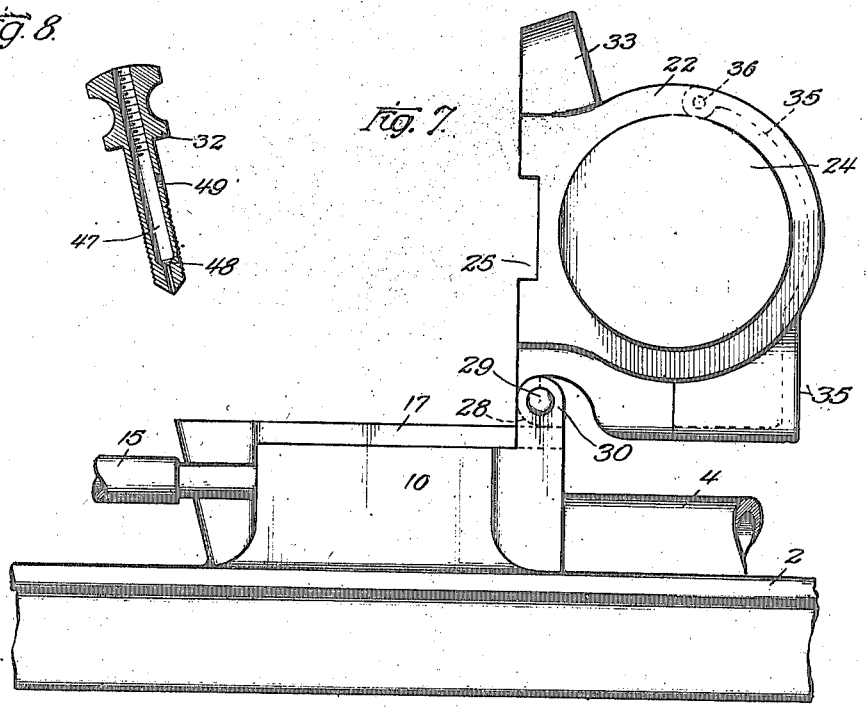

UNITED STATES PATENT OFFICE.

ARTHUR C. MACARTNEY, OF CHICAGO, ILLINOIS, ASSIGNOR TO PINE TREE MILKING MACHINE COMPANY, OF CHICAGO, ILLINOIS, A CORPORATION OF ILLINOIS.

MILKING-MACHINE.

1,266,697.  Specification of Letters Patent.  Patented May 21, 1918.

Application filed March 14, 1917. Serial No. 154,658.

*To all whom it may concern:*

Be it known that I, ARTHUR C. MACARTNEY, a subject of the King of Great Britain, residing at Chicago, in the county of Cook and State of Illinois, have invented a certain new and useful Improvement in Milking-Machines, of which the following is a specification.

My invention relates to milking machines and particularly the pulsators thereof. As is well known, the function of a pulsator is to create a pulsating vacuum in the milk cup or teat cup. In the form selected to illustrate the invention, I contemplate the use of a milk cup having a rigid casing with a resilient lining and purpose to subject the inside of the lining to a constant vacuum and the space surrounding the milk cup to a pulsating vacuum varying between substantially atmospheric pressure and a partial vacuum of suitable intensity. It will be understood that the term "vacuum" as herein employed means partial vacuum. The general purpose of the invention is to provide an improved pulsator. To this end I have produced a new organization and have made certain refinements which relate particularly to the construction and location of the reversing valve and of the pulsator valve and their controlling and actuating parts; also, to the provision of a valve seat of special construction; also to the construction and location of speed regulating mechanism and fastening means for the pulsator casing; also, to the form of the casing and closure thereof.

I accomplish my objects by the mechanism illustrated in the accompanying drawings, in which—

Figure 1 is a general assembly view of a milk pail and cover equipped with my improved pulsator. The parts are shown in section on the line 1—1, Fig. 3.

Fig. 2 is a top plan view of the pulsator.

Fig. 3 is a sectional view on the line 3—3, Fig. 2.

Fig. 4 is a top plan similar to Fig. 2 but showing the parts in changed position.

Fig. 5 is a plan view on the line 5—5, Fig. 3.

Fig. 6 is a sectional view on the irregular line 6—6, Fig. 1.

Fig. 7 is an end view of the pulsator, showing the cylinder or casing tilted up as will occur when it is being attached to or detached from its base.

Fig. 8 is an axial section of the combined regulating valve casing and holding screw.

Fig. 9 is a perspective view of the pulsator valve.

Fig. 10 is a bottom plan view of the reversing valve.

Fig. 11 is a perspective view showing the bottom of the reversing valve, the reversing valve holder and the stud which serve as a pivot and retaining means.

Similar numerals refer to similar parts throughout the several views.

The milk receptacle or pail 1 is provided with a cover 2. A pipe 3 leading from the receiver of a suitable air pump communicates with a passage 4 formed in the top of the cover. This passage is in constant communication with the inside of the pail through a port 5. Hence the pail is constantly under vacuum. A valve casing 6 is also formed in the cover 4 and forms a passage communicating with the inside of the pail and with the pipe 7 which leads to the inside of the lining of the milk cup. This puts the lining under a constant vacuum. The casing is provided with a shut off valve 8 of any suitable type.

The passage 4 leads to the base casting 10 which is preferably integral with the cover and forms a support for the pulsating mechanism. In the present instance three vertical passages 11, 12 and 13 are formed in the base, side by side as best shown in Figs. 3, 5 and 6. Passage 11 leads from passage 4 while passages 12 and 13 communicate respectively with the pipes 14 and 15 which lead to the two milk cups (not shown) and intermittently exhaust some of the air from the space between the casing and lining of the cups. Upon the base 10 is a valve seat 17 which has apertures or ports registering with the passages 11, 12 and 13. This plate is preferably of durable metal and hence forms a renewable wearing plate and valve seat. It is held against sliding to the right (Fig. 5) by the lugs 30 and against sliding to the left by the front of the base casting 10 shown in elevation in Fig. 7. It is held against transverse movement by said lugs 30, as will be seen by reference to Fig. 5.

The pulsator valve 18 which is shown separately in Fig. 9 is chambered underneath so that when slid back and forth upon the valve seat it will connect the vacuum passage 11 alternately with passages 12 and 13. When it is in a position to connect passages 11 and 12 it will uncover passage 13 and when in a position to connect passages 11 and 13 it will uncover passage 12. When thus uncovered, the passages 12 and 13 will be open to the atmosphere as will presently appear. The valve has a stem 19 which fits into a corresponding cavity 20 in the piston 21. By preference, the stem and cavity are rectangular in cross-section to prevent the valve from rotating out of position. The piston reciprocates in a cylinder or casing consisting, in the form shown, of a frame 22 into which are screwed two cylindrical elements 23, 24 having closed ends, as best shown in Figs. 3 and 6. The inside of the frame communicates with the atmosphere through ports 25, shown in Fig. 3. A slot 26 extends longitudinally in the lower part of the casing to accommodate the stem 19 of the pulsator valve. It forms a guide for the stem and, as the stem projects into the body of the piston, it prevents the piston from rotating about its longitudinal axis.

The cylinder or casing is demountable, having lugs 28 which engage a rod 29 held by lugs 30 formed upon base 10. The parts are so formed that when the casing is tilted up as shown in Fig. 7 it may be lifted off of the base, but will be securely held when lowered onto the base, as shown in Fig. 1. The casing is held seated by a screw 32 shown separately in Fig. 8. This passes through an aperture 31 formed in the boss 33 which is preferably integral with the frame. The threaded shank of the screw screws into the threaded portion of a passage 34 formed in base 10 as best shown in Fig. 1. Passage 34 communicates with the passage 4 in which a constant vacuum is maintained as previously explained. The frame is provided with a cover 35 which is hinged to it by the pin 36.

The piston is provided at each end with a cup leather 37 held in place by a disk 38 fastened by a screw 39 which screws into the piston. These screws are hollow, having longitudinal passages 40 which communicate with two ducts 41 and 42 formed in the piston, as best shown in Figs. 3 and 6. These lead to a point near the center of the piston, their inner ends being adjacent to the inner end of a passage 43. The latter leads to the side of the piston where it is at all times in communication with a chamber 44 formed in the frame 22. Said chamber is arranged longitudinally as best shown in Fig. 6, so that passage 43 will at all times communicate with it. A passage 45 leads down through the frame as best shown in Fig. 1 and communicates with the aperture 31, previously mentioned. Screw 32 is hollow and forms a valve casing for the regulating valve 46. The stem of this valve extends down into the chamber 47 in the screw and coöperates at the bottom with a valve seat 48 formed in the screw. Said screw has a port 49 at the side through which air may pass from the passage 45 and aperture 31 to the inside of the screw 32 and thence to the passages 34 and 4. By screwing valve 46 up or down the flow through screw 32 may be regulated and this regulates the speed of the piston. Screw 32 thus performs the combined function of a holding element for holding the frame seated upon its base and it forms part of a regulating device for predetermining the rate of movement of the piston and hence of the pulsator valve.

The flow of air through the passages 41, 42 and 43 is controlled by a reversing valve 52 which is shown separately in Fig. 10. This has a cavity 53 formed in its underside which serves to alternately connect passage 41 with passage 43 and then passage 42 with 43. The piston is cut away at the middle portion where a plane surface 54 is formed which constitutes a seat for said valve. In the form shown, the valve fits loosely within a holder 56, shown in perspective in Fig. 11. This holder is pivoted to the piston itself by a screw 57, the threaded shank whereof screws into the piston. A shoulder 58 is formed beneath the head 59 of the screw and this forms a pivotal bearing surface for the holder. It also enters the curved notch 59 in the side of the reversing valve and prevents the valve from rotating out of position in the holder. It also has another advantage in that it prevents the head of the screw from binding the holder and preventing free movement thereof. In the particular case shown, the valve holder has two chambers 62, 62 formed in its underside in order to admit atmospheric air alternately to the passages 41 and 42 when the latter are uncovered by the reversing valve.

The valve holder has two upstanding fingers 63 which receive between them the free end of a spring 64. This is here shown in the form of a flat spring arranged on edge and fastened at one end to a bracket 65 fastened on the stationary frame 22, as best shown in Figs. 2 and 4. Extending from the holder is an arm 67 adapted to slide upon a shoe 68 which forms part of the bracket 65. The spring tends to stand in normal position crosswise of the piston and hence exerts pressure on the valve holder to rotate it and the reversing valve about the screw 57 as an axis whenever the piston moves the holder to one side or the other of the central position of the spring. The parts are so proportioned that as the piston travels, the arm will slide along the shoe and at the same time strain the spring. As soon as the arm reaches the end of the shoe and disengages it, the spring quickly reverses the position of the valve. The throw of the holder is limited by two stops 66.

In operation, let it be assumed that the pipe 3 is connected to the receiver of an air pump so as to be under constant vacuum. Let it also be assumed that the milk cups have been adjusted to the animals and the pipes 14 and 15 connected to the milk cups. Ordinarily, the inside of the linings of the cups will also be connected to the constant vacuum pipe 7, although this feature is not particularly concerned with the present invention. When the parts have been thus connected, the inside of the milk pail and the passages communicating with pipe 3 soon become subjected to a suitable degree of vacuum. Let it be assumed that the piston and parts associated therewith are in the positions shown in full lines in Figs. 2 and 3. Under these conditions, the passage 12 will be uncovered by the pulsating valve 18 and hence will be open to the atmosphere through the ports 25. Hence the vacuum in pipe 14 will be temporarily destroyed. Passage 13 will have been recently if not simultaneously in communication with passage 4 and hence pipe 15 will be under vacuum. The reversing valve will also be in the position shown, passage 41 being connected by cavity 53 in the reversing valve with the passage 43 which at all times remains under vacuum. At the same time, the reversing valve will be in such a position that passage 42 in the piston will be in communication with the atmosphere through one of the chambers 62 in the valve holder. Consequently, the air will be sucked from the cylinder 23 at the left and freely supplied to the cylinder 24 at the right. Consequently, the piston will move to the left, thereby causing the pulsator valve to uncover the passage 13 and put the passage 12 in communication with the suction passage 11. The result is to admit air to pipe 15 and put pipe 14 under temporary vacuum. As the valve moves toward the left, the arm 67 of the reversing valve holder slides along the shoe 68 until it slips past the end thereof, whereupon the spring 64 instantly changes the position of the valve holder and valve from the one shown in Fig. 2 to the one shown in Fig. 4. Conditions are then reversed and the piston will start on its return journey. This program of operation will continue automatically so long as permitted. The speed at which the piston travels will be determined primarily by the rate at which the air is exhausted from in front of it, and this can be regulated by screwing the valve 46 nearer to or farther from its seat in the screw 32.

It will be noted that in my pulsator the pulsating valve 18 rides freely upon the valve seat plate 17 and is held seated by suction rather than by any mechanical pressure exerted upon it by the piston. The result is that the valve is self adjusting and the wear is automatically taken up. It is unnecessary to accurately configurate the stem of the valve or the cavity into which the stem fits. This construction has another advantage in that when the valve becomes worn, a new one can be readily substituted without necessitating a change either of the piston or of the frame in which the piston is supported. The same holds true of the reversing valve 52. Attention is also called to the fact that the reversing valve is carried by the piston itself. This greatly simplifies the construction and at the same time increases the efficiency by decreasing the length of the air passages, decreasing the number of parts involved, increasing the certainty of operation, and otherwise improving the device. Again, both of the valves and the valve operating parts are effectually housed and yet when inspection is desired, all that is necessary is to throw back the cover 35, whereupon the reversing valve and its associated parts are in plain view and readily accessible and lie in such position that they may be readily examined and removed if necessary. If the valve seat 17 becomes worn, it may be lifted out by throwing the frame 22 back upon its hinge rod 29 and simply lifting the valve seat out. The fact is, however, that as the valve seat presents a plane surface, both it and the pulsator valve can lose considerable metal by wear before leakage will take place. The speed regulating mechanism also is simplified and confined to small compass. The construction of the casing of the machine is simple as the cylinder ends are duplicate pieces and are attached by simply screwing them into the stationary framework.

Having thus described my invention, what I claim as new and desire to secure by Letters Patent, is:

1. A pulsator having a reciprocating piston with passages therein for conducting the motive fluid by which the piston is reciprocated, a reversing valve mounted upon and traveling with said piston for controlling the flow of motive fluid through said passages, said valve being movable relatively to said piston, and a non-movable shoe, the valve having an arm extending from it and traveling along said shoe and traveling beyond the end of it to become released therefrom.

2. A pulsator having a stationary frame, a reciprocating piston with passages therein for conducting the motive fluid by which the piston is reciprocated, a reversing valve mounted upon said piston and movable relatively thereto for controlling the flow of motive fluid through said passages, the valve having an arm, the outer end of which is remote from the center of the valve, a spring mounted upon the stationary frame and tending to move said valve relatively to the piston, and a stationary shoe along which said arm travels, said arm traveling beyond the end of the shoe to become released therefrom.

3. A pulsator having a reciprocating piston provided with passages for conducting the motive fluid by which the piston is reciprocated, a reversing valve rotatably mounted upon said piston for controlling the flow of motive fluid through said passages, a stationary shoe, the valve having a portion sliding upon the shoe and moving beyond the end of it, and a normally rectilinear spring extending crosswise of the line of travel of the piston, the valve being actuated solely by the spring and the spring being strained solely by the valve as the latter travels with the piston.

4. A pulsator having a reciprocating piston provided with passages for conducting the motive fluid by which the piston is reciprocated, a reversing valve rotatably mounted upon said piston for controlling the flow of motive fluid through said passages, a stationary shoe, the valve having a portion sliding upon the shoe and moving beyond the end of it, and a normally rectilinear spring and means for holding the same stationary at one end, the other end of the spring engaging the valve and urging the engaged part toward the neutral or central position of the spring.

5. A pulsator having a stationary frame, a reciprocating piston with passages therein for conducting the motive fluid by which the piston is reciprocated, a reversing valve upon said piston for controlling the flow of motive fluid through said passages, said valve traveling longitudinally with the piston and also having a rotary movement about an axis located within its own borders, a stationary shoe mounted upon said stationary frame, the valve having an arm extending from it and traveling along said shoe and beyond the end of the shoe to become released therefrom, and a normally rectilinear spring extending transversely to the travel of the piston, and means for holding one end of the spring stationary, the other end engaging the valve and being moved by the valve first one side and then the other side of neutral position.

6. In a pulsator, the combination, with the pulsating valve, of a double ended piston for actuating said valve, a double ended cylinder in which said piston reciprocates, said piston having passages in it for conducting the air by which the piston is reciprocated, a reversing valve seating upon said piston near the middle, a stationary shoe, an arm traveling upon and beyond said shoe for first holding and then releasing the reversing valve, and a spring held stationary at one end and at the other end connected to the reversing valve for actuating it.

7. A pulsator having a reciprocating piston provided with passages for conducting the motive fluid by which the piston is reciprocated, a reversing valve rotatably mounted upon said piston for controlling the flow of motive fluid through said passages, a stationary shoe, the valve having a portion sliding upon the shoe and moving beyond the end of it, and a normally rectilinear spring extending crosswise of the line of travel of the piston, the valve being actuated solely by the spring, and the spring being strained by the valve in direct proportion as the valve moves the spring away from the neutral or central position thereof.

8. A pulsator having a reciprocating piston provided with passages for conducting the motive fluid by which the piston is reciprocated, a reversing valve rotatably mounted upon said piston for controlling the flow of motive fluid through said passages, a stationary shoe, the valve having a portion sliding upon the shoe and moving beyond the end of it, and a normally rectilinear spring extending crosswise of the line of travel of the piston, and means for holding a portion of the length of the spring stationary, the free end of the spring being strained solely by the valve in its travel with the piston, and the valve being actuated solely by the spring.

9. A pulsator having a pulsator valve and a piston for actuating it, a cylinder wherein the piston reciprocates, said piston having ducts for the motive air within said piston, a valve seat formed upon said piston at the mouths of said ducts, a reversing valve sliding upon said seat, a holder wherein said valve is loosely fitted, a pivot pin screwing into the piston and serving as a pivot for the holder, the reversing valve being notched to engage said pin to prevent the dislocation of said reversing valve in its holder, a spring for actuating the holder, and means for alternately holding and releasing said holder.

10. A pulsator having a pulsator valve, a piston for reciprocating it, a cylinder wherein the piston reciprocates, said piston having ducts for the motive air by which the piston is reciprocated, a reversing valve mounted on said piston between its ends for controlling the flow of air through said ducts, means for operating said valve, and a frame for supporting the ends of the cylinder and housing the middle portion of the piston, said frame having a hinged cover for protecting the reversing valve and associated parts.

11. A pulsator having a pulsator valve, a piston for actuating it, a casing wherein said piston reciprocates, said casing having cylindrical ends for receiving the ends of the piston, the middle portion of the piston being cut away, said piston having ducts for conducting the motive air alternately to opposite ends of the piston, and controlling means for controlling the flow of air in said ducts, said controlling means being inclosed within the casing at and adjacent to the cut away portions of the system.

12. A pulsator having a base with passages therein for the pulsatory air, said base having a valve seat, a pulsator valve coöperating with said seat, a piston for actuating said pulsator valve, and a casing wherein said piston reciprocates, said casing being demountably mounted upon said base whereby, when the casing is removed, the wearing surface of the valve seat is exposed for inspection.

13. A pulsator having a base with passages therein for the pulsatory air, said base having a valve seat, a pulsator valve coöperating with said seat, a piston for actuating said pulsator valve, and a casing wherein said piston reciprocates, said casing and base having interfitting parts which are locked together when the casing is seated upon the base, the parts on the casing disengaging the parts on the base when the casing is tilted relatively to the base.

14. A pulsator having a base with passages therein for the pulsatory air, a pulsator valve for controlling the air in said passages, a piston for actuating said valve, said piston having ducts for conveying the motive fluid by which the piston is propelled, a casing wherein said piston reciprocates, said casing being detachably hinged at one side to said base, and a screw for securing the free side of the casing to the base, said screw having a passage in it which forms part of one of the said passages for the motive air, and a valve screwing into said screw for regulating the flow of air through it to thereby regulate the speed of the piston.

15. A pulsator having a base with passages therein for the pulsatory air, a pulsator valve sliding upon said base for controlling the flow of said air, a cylinder, and a piston reciprocating in said cylinder, said valve being supported solely by the base and having a polyangular portion loosely fitting into a polyangular cavity in the piston, whereby the valve is always free to make close contact with the base and is reciprocated along the base by the piston and is prevented by the polyangular portion of the valve from becoming displaced relatively to said piston.

16. A pulsator having a base with passages therein for the pulsatory air, a pulsator valve sliding upon said base for controlling the flow of said air, a cylinder and a piston reciprocating in said cylinder, said valve having an upright polyangular stem fitting into a polyangular cavity in the bottom of the piston for the purposes described.

17. A pulsator having a base with passages therein for the pulsatory air, a pulsator valve, means for actuating said valve, and a valve port plate resting upon said base and having ports registering with the said passages in the base, said plate being removable whereby it may be replaced when worn, and the pulsator valve being freely movable toward and from said plate and supported by said plate.

18. A pulsator having a base with passages therein for the pulsatory air, a pulsator valve, a piston for actuating said valve, a casing wherein said piston reciprocates, said casing having a longitudinal slot and the valve having a stem passing through said slot and fitting slidingly therein and engaging the piston whereby the slot forms a guide for the stem and prevents the piston from rotating about its axis.

19. A pulsator having a stationary frame with passages therein for the pulsatory air, a pulsator valve for controlling said passages, a piston for operating said valve, and cylindrical caps removably fastened to opposite ends of the frame and constituting cylinders wherein the piston works, the pulsator valve being detached from the piston and hence free to move toward its seat independently of the position of the piston, whereby accurate boring and alinement of the cylindrical caps is unnecessary.

20. A pulsator having a stationary frame with passages in it for the pulsatory air, the ports for said passages coming through a horizontal valve seat formed on the said frame, a pulsator valve for controlling said passages, a piston, and cylindrical caps removably fastened to the frame and facing each other, said caps having closed outer ends and forming cylinders wherein the piston works, the pulsator valve being engaged by but detached from the piston and caused by the piston to slide upon its seat and said piston having flexible packing washers, as a result of which and the free moving valve, accurate boring and alinement of the cylindrical caps is unnecessary.

21. A pulsator having a stationary frame provided with passages for the pulsatory air, said frame having a horizontal valve seat containing the ports for said passages, a pulsator valve for controlling said passages, a piston and cylindrical caps removably fastened to the frame and facing each other, said caps having integral outer ends and forming cylinders wherein the piston works, the pulsator valve being engaged by the piston to be actuated thereby, but being detached therefrom whereby it is free to ride upon the valve seat, the piston being provided with cup leathers, all for the purpose described.

In witness whereof, I have hereunto subscribed my name.

ARTHUR C. MACARTNEY.